(12) United States Patent
Nakamura et al.

(10) Patent No.: US 7,052,797 B2
(45) Date of Patent: May 30, 2006

(54) SEALING STRUCTURE OF FUEL CELL AND PROCESS FOR MOLDING RUBBER PACKING

(75) Inventors: Yuzo Nakamura, Kobe (JP); Haruhito Takao, Kobe (JP)

(73) Assignee: Tigers Polymers Corporation, Osaka (JP)

( * ) Notice: Subject to any disclaimer, the term of this patent is extended or adjusted under 35 U.S.C. 154(b) by 406 days.

(21) Appl. No.: 10/212,517

(22) Filed: Aug. 6, 2002

(65) Prior Publication Data

US 2002/0192529 A1  Dec. 19, 2002

Related U.S. Application Data

(63) Continuation of application No. 09/626,239, filed on Jul. 26, 2000, now Pat. No. 6,451,469.

(30) Foreign Application Priority Data

Jul. 26, 1999 (JP) ............ 11-210685
Jan. 12, 2000 (JP) ............ 2000-006233

(51) Int. Cl.
*H01M 2/08* (2006.01)

(52) U.S. Cl. ............ 429/36; 429/35; 429/38; 429/30; 427/115

(58) Field of Classification Search ........ 429/36, 429/35, 38, 30; 427/115
See application file for complete search history.

(56) References Cited

U.S. PATENT DOCUMENTS

| 5,176,966 A | 1/1993 | Epp et al. .......... 429/42 |
| 6,096,451 A | 8/2000 | Shiratori et al. ...... 429/36 |
| 6,231,053 B1 | 5/2001 | Wakamatsu ......... 429/39 |
| 6,451,469 B1 * | 9/2002 | Nakamura et al. ..... 429/36 |

FOREIGN PATENT DOCUMENTS

| DE | 100 28 395 | | 12/2000 |
| EP | 918 362 | | 5/1999 |
| EP | 1 174 482 | | 1/2002 |
| JP | 10092450 | | 4/1998 |
| JP | 2000-920 | * | 1/2000 |
| JP | 2000-77084 | | 3/2000 |

* cited by examiner

*Primary Examiner*—Laura Weiner
(74) *Attorney, Agent, or Firm*—Pillsbury Winthrop Shaw Pittman LLP

(57) ABSTRACT

A fuel cell separator unit having a crosslinked rubber layer is fabricated by coating a rubber-containing coating agent on the periphery of the surface of a separator to form a thin, unvulcanized rubber layer, and then vulcanizing or crosslinking the thin rubber layer. A tightly sealed fuel cell is constituted by providing both sides of the main body of the fuel cell with separator units fabricated in the manner described above. When a fuel cell separator fabricated through a crosslinking by radioactive ray irradiation, the performance of the fuel cell is not hindered by the ingredient(s) of a rubber packing. The present invention provides a fuel cell sealing structure which ensures a perfect sealing. According to the present invention, a step of attaching a thin rubber packing is no longer necessary.

11 Claims, 1 Drawing Sheet

SEALING STRUCTURE OF FUEL CELL AND PROCESS FOR MOLDING RUBBER PACKING

This is a Continuation of National application Ser. No. 09/626,239 filed Jul. 26, 2000, now U.S. Pat. No. 6,451,469.

FIELD OF THE INVENTION

The present invention relates to a sealing structure of a fuel cell, particularly of a solid polymer-type fuel cell; a fuel cell separator unit useful in realizing this sealing structure; and a process for producing the same (or a molding process of a rubber packing used in-the sealing structure).

BACKGROUND OF THE INVENTION

A solid polymer-type fuel cell comprised of a cathode electrode, an anode electrode, and such a polymer electrolytic membrane as a membrane of an ion exchange resin having ion conductivity interposed therebetween starts generating electricity by, for example, supplying a fuel gas such as hydrogen gas to the anode electrode and an oxidant gas such as an oxygen gas or air to the cathode electrode thereby to cause an electrochemical reaction and convert the chemical energy of the fuel gas into electric energy (electricty).

Such solid polymer-type fuel cell is usually constituted of a fuel cell assembly composed of a plurality of stacked unit cells. Between adjacent single cells are provided separators. Each separator is provided with fuel gas passageways and oxygen gas passageways, with which the fuel gas and the oxidant gas are isolated. Each electrode and its adjoining separator need to be gas-sealed tightly thereby to prevent the leakage of fuel gas or oxidant gas from the edge or periphery of the polymer electrolytic membrane. Therefore, in assembling a fuel cell, a sealing structure is usually constructed by having a rubber packing (particularly, a thin rubber packing) made by compression molding, injection molding, or by punching out of a sheet be present between an electrodes and a separator.

In the sealing structure described above, however, the gas sealing against the fuel gas and the oxidant gas needs to be strictly retained for a long period of time, leading to a need for the rubber packing to be improved in its integrity and durability. Since the above-described rubber packing is a very thin membrane, forming such flexible packings by compression molding or injection molding not only results in variations in film thickness consequently leading to a lack in integrity but also makes their positioning at predetermined locations of the fuel cell difficult. Moreover, when assembling a fuel cell, the rubber packings are sometimes deformed or dislodged and therefore unable to provide a sure sealing.

U.S. Pat. No. 5,176,966 discloses the fabrication of fuel cells, in which a solid polymer ion exchange membrane and carbon fiber paper layers between which the membrane is interposed are heat-pressed for unitarily joining them into a single assembly, and the single assembly is processed to provide the assembly with sealing grooves. Then, a sealant of silicon rubber is injected into the grooves for sealing, and a fuel cell is assembled by using guide pin holes. The fabrication of this fuel cell, however, involves providing the carbon fiber paper layers integrally joined to the ion exchange membrane and constituting the unit assembly with sealing grooves. In addition to having the possibility of giving damage to the carbon fiber paper layers, this is not easy, much less the injection of the sealant into the grooves.

Japanese Patent Application Laid-Open No. 92450/1998 (JP-A-10-92450) discloses a sealing material for sealing a cell and separators constituting a solid electrolytic fuel cell, in which the sealing material is a glass material which softens at a temperature lower than the operating temperature of the solid electrolytic fuel cell and crystallizes at the operating temperature to be solid crystalline glass. Such sealing material, however, needs to be set at a predetermined place between the cell and the separators with accurate positioning. As a result, an easy and efficient assemblage of the fuel cell cannot be achieved.

SUMMARY OF THE INVENTION

Thus, an object of the present invention is to provide a sealing structure which realizes a sure placement of a rubber packing at a predetermined position and ensures a tight sealing, a fuel cell separator unit useful in constructing this sealing system, and a process for producing the same (or a molding process of rubber packings used in the sealing system).

Another object of the present invention is to provide a fuel cell separator unit on which a rubber packing of high integrity and durability can be formed with high working efficiency even if the packing is thin, and a process for producing the same (or a process of molding a rubber packing used in the sealing system).

Another object of the present invention is to provide a sealing structure for a fuel cell which realizes the provision of a sure sealing and the assemblage of a fuel cell assembly with high productivity as well as the omission of a rubber packing placement step, a fuel cell separator unit useful in constructing this sealing system, and a process for producing the same.

The inventors of the present invention found that forming a vulcanized or crosslinked rubber layer as a rubber packing on the periphery or edge of a separator of a fuel cell realizes a sure placement of even a thin rubber layer packing at a predetermined location, ensuring a tight sealing, which eliminates the need for a step of attaching the rubber packing between the electrode and a separator. The present invention was accomplished based on the above findings.

That is, the sealing structure of a fuel cell of the present invention is comprised of a single cell, a separator on each side of the single cell, and a packing interposed between the single cell and the separator. The packing is constituted of a vulcanized or crosslinked rubber layer and adhered to the periphery of the separator. The single cell comprises an electrolytic layer (e.g., solid polymer electrolytic membrane), and a cathode electrode and an anode electrode provided on both sides of the electrolytic layer.

The fuel cell separator unit of the present invention is a separator unit provided on each side of the single cell of the fuel cell and capable of sealing the periphery or edge of the single cell. The separator unit comprises a gas-impervious separator and a vulcanized or crosslinked rubber layer formed on the periphery of the separator. The rubber layer can be vulcanized or crosslinked by using a vulcanizing agent or a crosslinking agent, or by irradiation of radioactive rays.

The fuel cell separator unit can be fabricated by coating a rubber-containing coating agent on the periphery of the separator and then vulcanizing or crosslinking the rubber layer. The coating fluid can be screen-printed on the periphery of the separator (e.g., in the form of a loop), and a thin rubber layer integrally joined to the separator can be formed by directly applying the coating agent on the surface of the separator, drying the coat, and then vulcanizing or crosslinking the rubber.

DETAILED DESCRIPTION OF THE INVENTION

Hereinafter, the present invention will be described in further detail with reference to the attached figures.

Figure 1:
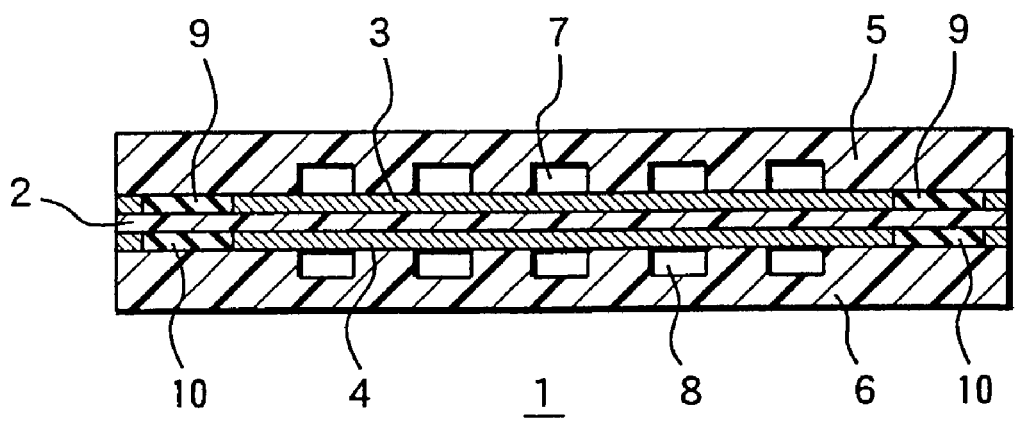
FIG. 1 is a schematic longitudinal sectional view showing a unit cell as a component of a solid polymer fuel cell.

FIG. 1 is a schematic longitudinal sectional view showing a unit cell 1 as a component of a solid polymer fuel cell, and the fuel cell is usually a stack or assembly (not shown) of a plurality of unit cells 1.

In FIG. 1, the unit cell 1 comprises a single cell (or the main body of the fuel cell) and a separator provided on each side of the single cell (i.e., the single cell is interposed between the separators). The single cell comprises a polymer electrolytic membrane 2, and a cathode electrode 3 and an anode electrode 4 on both sides of the membrane 2. Moreover, there are provided a separator 5 and a separator 6 such as to abut against the cathode electrode 3 and the anode electrode 4 of the single cell (or the main body of the fuel cell), respectively. These separators 5 and 6 are made from a material of high electrical conductivity as well as of gas-imperviousness (e.g., carbonaceous conductor). That is, the separators 5 and 6 function as bipolar plates with both gas sealing properties and conductivity (e.g., current collectors or current collecting plates).

The surface on the cathode electrode 3 side of the separator 5 is provided with grooves 7 for supplying an oxidant gas, these grooves 7 communicating with an oxidant gas-supplying pipe (not shown). The surface on the anode electrode 4 side of the separator 6 is provided with grooves 8 for supplying a fuel gas, the grooves 8 communicating with the fuel gas-supplying pipe (not shown).

In the unit cell 1, rubber packings 9 and 10 are interposed between the single cell and the separators 5 and 6, not only preventing the fuel gas and the oxidant gas from leaking out of the single cell (the main body of the fuel cell) composed of the polymer electrolytic membrane 2, the cathode electrode 3, and the anode electrode 4 but also ensuring the insulation between the separator 5 on the cathode electrode side and the separator 6 on the anode electrode side. The rubber packings 9 and 10 are surrounding the single cell like frames (in other words, each packing is in the form of a loop).

In the present invention, the rubber packings 9 and 10 are directly molded on the peripheries of the surfaces of the separators 5 and 6 in advance, and then the molded rubber packings are fused integral with or bonded integral to the separators in a vulcanizing step. That is, in the sealing structure, the packing 9 (or 10) is directly adhered to the periphery of the separator 5 (or 6) (such as to have an intimate contact with the separator and take the form of a loop), and constituted of a thin vulcanized or crosslinked rubber layer of uniform thickness.

Figure 2:
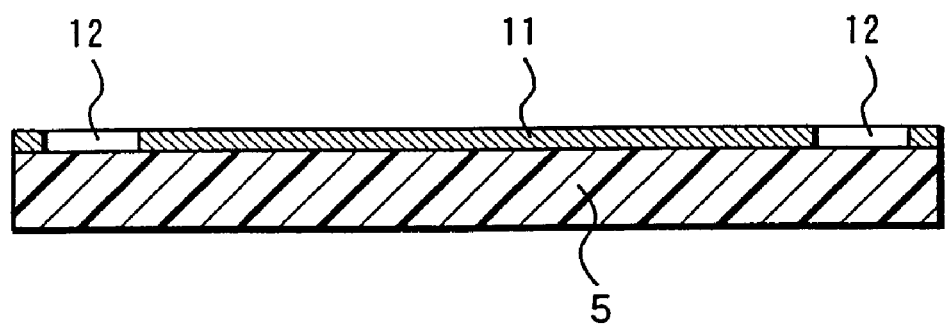
FIG. 2 is a schematic sectional view showing part of the process for molding a rubber packing.
Figure 3:
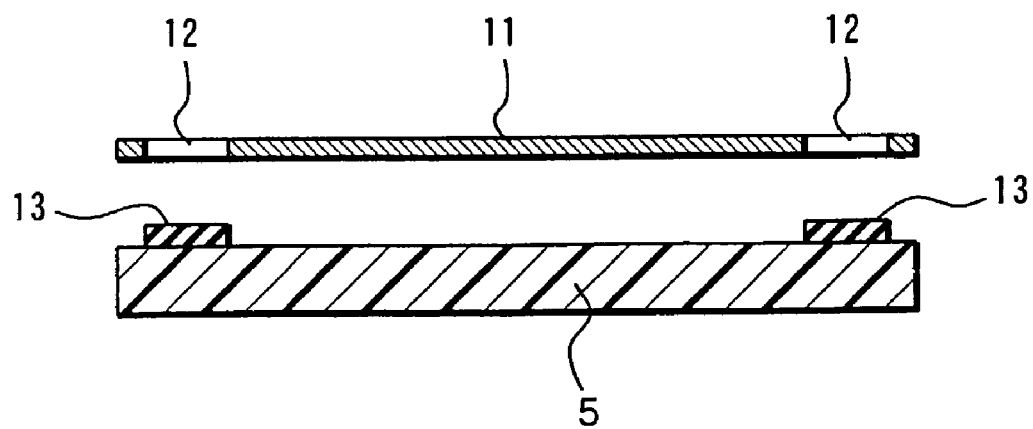
FIG. 3 is a schematic sectional view showing a separator unit in which a rubber packing is integrally joined to a separator.

As shown in FIG. 2 and FIG. 3, the rubber packing 9 (or 10) is made as follows: a non-vulcanized rubber coating layer 13 is formed by the screen printing in which the surface of the separator 5 (6) is covered with a mask 11 having a frame-like cutout 12 (through holes) and a fluid of a rubber compound dissolved in a solvent is applied over the mask. The application of the rubber-dissolved fluid is repeated for a predetermined times (e.g., plurality of times) until the fluid accumulated in the cutout 12 forms an unvulcanized rubber coating layer 13 of the shape corresponding to the shape of the cutout 12 and of a predetermined thicknss. After the solvent has been vaporized, the unvulcanized rubber coating layer 13 is vulcanized, and the rubber layer 13 (rubber packing 9) thus unitarily formed on the periphery of the separator 5 is thin and frame-like.

The use of the separators previously integrated with rubber sealings makes a placement step of rubber packings unnecessary, leading to an easier step of merely providing a separator unit on each side of the single cell (even if the rubber sealing layers are thin). As a result, the construction of a unit cell with surely and accurately positioned packings is realized. In addition, a sealing structure for a solid polymer fuel cell with better assemblage efficiency and high productivity can be realized with ease.

The electrolytic membrane as a component of the single cell of the fuel cell is not particularly restricted, and may for example be a phosphoric acid-type electrolytic membrane, not limited to a solid polymer electrolytic membrane. As the electrolytic membrane, a solid electrolytic membrane, particularly a solid polymer electrolytic membrane typified by a Nafion membrane made of a fluorine-containing resin into which a sulfonic acid group is introduced, is preferably used.

The separator unit of the present invention is provided on each side of a single cell of a fuel cell and capable of sealing the periphery of the single cell. The separator unit is comprised of a gas-impervious separator and a vulcanized or crosslinked rubber layer integrally formed on the periphery of the separator. This rubber layer can make a tight contact with the single cell. The separator of the separator unit need only be gas-shieldable or gas-impervious, and it is not limited to a current collector having electric conductivity and may be non-conductive. As the separator as a member of the separator unit, in many cases, a current collector is usually employed. As the bipolar separator, a material of high conductivity and low gas-perviousness, such as a carbonaceous material (e.g., carbon graphite complex material) is available.

The rubber forming the rubber layer need only be vulcanizable or crosslinkable, and examples of which are diene-series rubbers [e.g., natural rubber (NR) or isoprene rubber (IR), butadiene rubber (BR), styrene-butadine rubber (SBR), nitrile rubber (acrylonitrile-butadiene rubber (NBR)), chloroprene rubber (CR)], butyl rubber (IIR), silicone rubber (Q) (polydimethylsiloxane rubber (MQ), methyl vinyl silicone rubber (VMQ), phenyl silicone rubber (PMQ), fluorine-containing silicone rubber (FVMQ), phenyl vinyl methyl silicone rubber (PVMQ)); olefinic rubbers (ethylene-propylene rubber (EPM), ethylene-propylene-diene rubber (EPDM); acrylic rubbers (e.g., copolymeric rubbers containing an acrylic acid $C_{2-8}$alkyl esters such as ethyl acrylate and butyl acrylate) (e.g., ACM, ANM); fluorine-containing rubbers (FKM); urethane rubbers (U); ethylene-vinyl acetate copolymer; ethylene-acrylic acid ester copolymers; polynorbornene rubbers; and thermoplastic elastomers (e.g., polyolefinic elastomers, polyester-series elastomers, polyurethane-series elastomers, polyamide-series elastomers, styrenic resin elastomers). As the rubber, liquid rubbers or rubbers in paste form can also be utilized, example of which are liquid polybutadienes, liquid polyisoprenes, liquid polychloroprenes, and silicones in liquid or paste form (RTV (room temperature valcanizable) silicone rubbers, LTV (low temperature valcanizable) silicone rubbers). These rubbers can be used either singly or in combination. If a liquid rubber, such as a liquid silicone rubber, is used as the rubber fluid, the rubber will be coated without being dissolved in a solvent.

It is preferred that the rubber layer is formed from a rubber inert to a fuel gas and an oxidizing agent. Exemplified as such rubber are the above-listed olefinic rubbers and silicone rubbers, which are excellent in cushioning properties.

The rubber layer is one vulcanized or crosslinked by a vulcanizing agent, a crosslinking agent, or irradiation of radioactive rays. As the vulcanizing agent, although sulfur-containing vulcanizing agents are available, organic peroxides such as dicumyl peroxide, di-t-butyl peroxide, and 2,5-dimethyl-2,5-di(t-butylperoxy)hexane are preferred. The amount of the vulcanizing agent to be used can be selected within the range of about 0.1 to 20 parts by weight, preferably about 1 to 10 parts by weight, relative to 100 parts by weight of the rubber.

Exemplified as the crosslinking agent are alkylene glycol di(meth)acrylates such as ethylene glycol di(meth)acrylate, propylene glycol di(meth)acrylate, butanediol di(meth)acrylate, hexanediol di(meth)acrylate, and neopentyl di(meth)acrylate; polyoxyalkylene glycol di(meth)acrylates such as diethylene glycol di(meth)acrylate, triethylene glycol di(meth)acrylate, tetraethylene glycol di(meth)acrylate, and dipropylene glycol di(meth)acrylate; di(meth)acrylates of alkylene oxide adducts of bisphenol A; trimethylolpropane tri(meth)acrylate; pentaerythritol tri(meth)acrylate; pentaerythritol tetra(meth)acrylate, and triallylisocyanurate. These crosslinking agents can be used either singly or in combination. Incidentally, these multifunctional monomers can serve also as solvents for the rubber.

The amount of the polyfunctional monomer can be selected within the range of, for example, about 1 to 100 parts by weight, preferably about 2 to 50 parts by weight, and more preferably about 5 to 30 parts by weight relative to 100 parts by weight of the rubber.

If necessary, for adjusting the viscosity of the rubber-containing fluid or the properties of the rubber layer, a monofunctional monomer may be used either singly or in combination with the multifunctional monomer, examples of which are (meth)acrylic acid alkyl esters, (meth)acrylic acid hydroxyalkyl esters, (meth)acrylic acid glycidyl esters, and vinylpyrrolidones.

Preferable rubber layers are those vulcanized or crosslinked by peroxides or irradiation of radioactive rays. In the crosslinking by radiation, if necessary, a photopolymerization initiator (e.g., ketones typified by benzophenone-series compound, benzoin-series compounds, xanthone-series compounds, and others) may be incorporated into the rubber layer. The amount of the photopolymerization initiator can be selected within the range of, for example, 1 to 10 parts by weight relative to 100 parts by weight of the polymerizable monomer (the multifunctional monomer, the monofunctional monomer).

Particularly, it is preferred that the rubber layer is the one crosslinked by irradiation of radioactive rays and substantially free from a vulcanizing agent (or crosslinking agent) and a vulcanization auxiliary (or crosslinking auxiliary). The rubber layer (thin, film-like rubber layer) formed through the crosslinking by irradiation of radioactive rays has a C—C bond directly formed between the chains of the rubber molecules, therefore requiring no further incorporation of a vulcanizing agent or vulcanization auxiliary such as sulfur or a peroxide, which as a result gives no undesirable influence on the performance of the fuel cell. Moreover, cationic impurities that hinder the performance of the fuel cell (e.g., metal oxides typified by zinc oxide, magnesium oxide, and others) will never be leaked. The rubber layer may be a photopolymerization initiator-free one with reduced risk of deteriorating the performance of the fuel cell.

Further, the rubber layer may contain a reinforcing carbon black. Examples of the carbon black are furnace carbon black, acetylene carbon black, channel carbon black, lamp-carbonblack, Ketjencarbonblack, and thermal carbon black. These carbon blacks can be used either singly or in combination.

The mean particle size of the carbon black is not particularly restricted, and is about 10 to 500 nm, preferably 20 to 400 nm, and more preferably about 50 to 350 nm. The nitrogen adsorption specific surface area of the carbon black is, for example, about 5 to 150 $m^2/g$, preferably about 10 to 100 $m^2/g$. The dibutyl phthalate (DBP) oil absorption is, for example, about 10 to 130 $cm^3/100$ g, preferably about 25 to 100 $cm^3/100$ g.

Preferred carbon blacks include carbon blacks with less impurities, with thermal carbon black particularly preferred. The thermal carbon black is a type of carbon black produced by a thermal (thermal decomposition) process, in other words, by introducing a natural gas into a furnace heated to the thermal decomposition point by burning fuels, and thermally decomposing the gas. Thermal carbon black is larger in particle size, lower in structure, and much smaller in specific surface area than those of oil furnace carbon black, acetylene carbon black, and other carbon blacks. In addition, thermal carbon black is excellent in electrical insulating property and features its extremely low impurities content (e.g., ash content, sulfur content) due to complete combustion. Therefore, rubber packings incorporating thermal carbon black contains little or no impurities that exert undesirable influences on the performance of the fuel cell and thus is favorably used as the packings for fuel cell separator units.

The mean particle size of thermal carbon black as a preferred carbon black is usually about 100 to 500 nm, preferably about 120 to 500 nm, more preferably about 150 to 400 nm, and particularly about 200 to 350 nm (e.g., 240 to 310 nm). The nitrogen adsorption specific surface area of thermal carbon black is, for example, about 5 to 20 $m^2/g$, preferably about 7 to 15 $m^2/g$ (e.g., 9 to 9.5 $m^2/g$). The dibutyl phthalate (DBP) oil absorption is, for example, 10 to 50 $cm^3/100$ g, preferably 20 to 45 $cm^3/100$ g, and more preferably about 25 to 45 $cm^3/100$ g (e.g., 34 to 40 $cm^3/100$ g).

The carbon black (particularly, thermal carbon black) content of the rubber layer is, for example, 10 to 100 parts by weight, preferably about 20 to 80 parts by weight, and more preferably about 30 to 70 parts by weight relative to 100 parts by weight of the rubber.

If necessary, to the rubber layer may be added a conventional compounding agent, such as vulcanization accelerators, activators, vulcanization retarding agents, stabilizers (e.g., antioxidants, ultraviolet ray absorbers, heat stabilizers), plasticizers, fillers (e.g., white carbon, talc, calcium carbide), softening agents, lubricants, tackifiers, coloring agents, curing agents, and reinforcing agents. It is preferred that a component(s) chosen as an additive(s) is a substance that exerts no adverse influence on the properties of the fuel cell.

The fuel cell separator unit of the present invention can be fabricated by coating a rubber-containing coating agent on the periphery of a separator to form a layer, and then vulcanizing or crosslinking this rubber layer.

As described above, the rubber may be incorporated into the coating agent in the form of a rubber-compounded composition combined with an additive such as a vulcanizing agent or a crosslinking agent.

As the solvent for the coating agent, a variety of rubber-dissolvable or dispersive solvents are available, examples of which are hydrocarbons (e.g., aliphatic hydrocarbons such as hexane and octane; alicyclic hydrocarbons such as cyclohexane; aromatic hydrocarbons such as toluene); halogenated hydrocarbons; alcohols (e.g., aliphatic alcohols such as ethanol and isopropanol); ketones (e.g., acetone, methyl ethyl ketone, methyl isobutyl ketone); esters (e.g., ethyl acetate, butyl acetate); and ethers (e.g., diethyl ether, dioxane, tetrahydrofuran). These solvents may also be used as mixed solvents. If the rubber is in the form of an emulsion, the solvent may be water or a water-soluble one (e.g., alcohols, cellosolves).

The viscosity (at 23° C.) of the rubber coating agent (solution) is, for example, about 0.1 to 40 Pa·s, preferably about 0.5 to 30 Pa·s, and more preferably about 1 to 15 Pa·s. If the viscosity is less than 0.1 Pa·s, in order to form an unvulcanized rubber coating layer of a predetermined thickness, the number of times of coating needs to be increased. Also, the rubber agent having a viscosity exceeding 40 Pa·s is poor in flowability, and therefore it is hard to let the rubber fluid pass through the mask, with larger variations in thickness of the coating layer.

Although the rubber layer can be made by utilizing ink jet printing, from the view point of productivity, conventional printing methods, particularly screen printing is advantageous. Screen printing is conducted in such a conventional manner as a manner in which the surface of the separator is covered with a mask, through which a rubber coating agent is applied on the periphery of the separator to form a rubber coating layer of a predetermined thickness (e.g., a layer in the form of a loop). Particularly, the screen printing can be conducted using a mask or screen having through-holes or a cutout corresponding in shape and area to the rubber layer. In order to form the rubber layer having a certain thickness, the coating agent may repeatedly be coated or printed. Usually, the rubber layer formed by coating is in the form of a closed loop corresponding to the top view of the packing.

For improved tightness between the separator and the rubber layer, the separator itself may be pretreated. A thin rubber layer integral with the separator can be formed by directly applying the coating fluid on the surface of the separator, removing the solvent, drying the coat, and then subjecting the coat to vulcanization or crosslinking. The thickness of the rubber layer is not particularly restricted provided that the sealing properties thereof are not adversely affected, and can suitably be selected within the range of about 30 μm to 1 mm, preferably about 50 μm to 0.8 mm, and more preferably about 100 to 500 μm.

The rubber layer containing the vulcanizing agent or crosslinking agent may be vulcanized or crosslinked by being heat-pressed. Vulcanization or crosslinking can be effected by a conventional method, for example, by heat-pressing the rubber layer at 100 to 200° C.

As to the crosslinking by radiation exposure, although it does not matter if the rubber layer is crosslinked by the irradiation of ultraviolet rays, it is preferred that the rubber layer is crosslinked by the irradiation of a high activation energy-bearing ray, such as electron beams, X-ray and gamma rays. In the process of assembling a fuel cell by stacking a plurality of separator units increasingly required to be down-sized further, as described above, a step of attaching rubber packings is unnecessary in the present invention and the rubber packings need not be heat-pressed and are molded through crosslinking by radioactive ray irradiation. Therefore, in contrast to the case of vulcanization or crosslinking by heat, vulcanization or crosslinking by radiation has no risk of damaging the separators made of carbon graphite and therefore of degrading the quality of the separators.

With the thermal resistance or physical strength of the rubber packings all considered, in the crosslinking by irradiation of radioactive rays, the way of irradiation and conditions will be optimized. Moreover, the rubber layer may be crosslinked by a combination of crosslinking techniques. For example, the crosslinking by radioactive rays is not limited to a complete crosslinking of the rubber, and the rubber may be pre-crosslinked using radioactive rays and then post-crosslinked using heat or microwaves.

In the present invention, sealing materials as packings interposed between a single cell (the main body of the fuel cell) and separators are previously molded and integrally joined to the surfaces of the separators in position, so that a step of fitting sealing members into the spaces between the cell and the separators is unnecessary and the rubber packings can surely be provided at desired positions without being deformed or dislodged. In addition, the present invention ensures a tight sealing, for the single cell (the main body of the fuel cell) and the separators can surely be gas-sealed with ease. Particularly, even if the rubber packings are thin, the present invention makes it possible to install such rubber packings in the fuel cell with high working efficiency, consequently realizing a highly efficient production of fuel cell assemblies.

According to the process of the present invention (or the molding process of rubber packings used in the sealing structure described above), it is possible to fabricate rubber packings of high integrity and high durability. Particularly, according to the present invention, even an extremely thin rubber sealing can be produced with high accuracy and good yield. Moreover, in addition to having no risk of damaging the separators, crosslinking of the rubber packings by irradiation of radioactive rays inhibits impurities from eluting out from the rubber packings. As a result, the performance of the fuel cell is not deteriorated.

EXAMPLES

Hereinafter, the present invention will further be described based on the following examples.

Example 1

An unvulcanized rubber was prepared by incorporating 3 parts by weight of a dicumyl peroxide (DCP/100) as a crosslinking agent into 100 parts by weight of a commercially available ethylene-propylene tarpolymer rubber (EPT) as the starting material rubber along with a plasticizer, a filler, a lubricant (e.g., stearic acid, 1.0 part by weight), and other desired additives, and mixing the ingredients using a mixing roll. The unvulcanized rubber thus formed was then cut into pieces of about 1 cubic centimeter, and the pieces, together with toluene, are fed to a stirrer equipped with a vacuum deaerator, and dissolved by being stirred under atmospheric pressure for 10 hours. With the vacuum deaerator driven, the resultant mixture was stirred with deaeration under a vacuum for another 15 minutes.

Incidentally, the ratio of the unvulcanized rubber and toluene was 30/70 (weight ratio), and the viscosity (at 23° C.) of the rubber fluid (solution) was adjusted to 5 Pa·s.

Thereafter, the deaerated, dissolved EPT rubber fluid (solution) was applied on a predetermined surface of a carbon graphite current collector by screen printing, and the coat was dried using a hot air drier (80° C.) for 5 minutes to volatilize the solvent. This coating and drying operations were repeated 7 times to form an unvulcanized rubber coating layer of 300 μm thick on the periphery of the surface of the current collector. Then, a rubber sealing integrated with the current collector was made by crosslinking the rubber layer by irradiating electronic beams.

Example 2

An unvulcanized rubber was prepared by incorporating 40 parts by weight of thermal carbon black (manufactured by Cancarve, Co., Ltd., MT carbon N990 Ultrapure) as a reinforsing agent into 100 parts by weight of a commercially available rubber EPDM as a starting material rubber, and mixing the ingredients using a mixing roll. The unvulcanized rubber thus formed was then cut into pieces of about 1 cubic centimeter, and the pieces, together with toluene, are fed to a stirrer equipped with a vacuum deaerator, and dissolved by being stirred under atmospheric pressure for 10 hours. Then, with the vacuum deaerator driven, the resultant mixture was stirred with deaeration under a vacuum for another 15 minutes.

Thereafter, the deaerated, dissolved EPDM rubber fluid (solution) was applied on a predetermined surface of a carbon graphite current collector by screen printing, and the coat was dried using a hot air drier (80° C.) for 5 minutes to volatilize the solvent. This coating and drying operations were repeated 7 times to form an unvulcanized thin rubber membrane of 300 μm thick on the periphery of the surface of the separator. Then, the separator with the rubber layer was put in an electronic beam irradiator and the rubber layer was irradiated with a quantity of electronic beam radiation of 15 to 80 Mrad in an atmosphere of nitrogen for crosslinking, so that a fuel cell separator unit with a rubber packing directly formed on and integrally joined thereto was obtained.

What is claimed is:

1. A process that forms a sealing structure interposed between a single cell and a separator on each side of the single cell in which the single cell includes a solid polymer electrolytic membrane, a cathode electrode, and an anode electrode and the separator is electrically conductive and gas impervious, said process comprising:

coating a rubber-containing coating agent on a periphery of the separator to form a non-vulcanized or a non-crosslinked rubber layer;

vulcanizing or crosslinking the rubber layer to adhere to the separator; and assembling the single cell by contacting the vulcanized or crosslinked rubber layer of the separator with the cathode electrode and the anode electrode to seal the periphery of the solid polymer electrolytic membrane, wherein the rubber-containing coating agent is printed on the periphery of the separator by screen printing.

2. A process according to claim 1, wherein viscosity of the coating agent at 20° C. is about 0.1 to about 40 Pa·s.

3. A process according to claim 1, wherein the coating agent is directly coated on the surface of the separator, dried, and vulcanized or crosslinked to form a thin rubber layer.

4. A process according to claim 1, wherein the surface of the separator is covered with a mask, the coating agent contains a solvent and is repeatedly applied on periphery of the separator to form a rubber printed or coated layer of a predetermined thickness, the solvent is removed, and the rubber printed or coated layer is vulcanized or crosslinked to form a thin rubber layer integrally joined to the separator.

5. A process according to claim 1, wherein the rubber layer is vulcanized or crosslinked by a vulcanizing agent, a crosslinking agent, or irradiation of radioactive rays.

6. A process according to claim 1, wherein the coating agent is substantially free from a crosslinking auxiliary, and the rubber layer is crosslinked by irradiation of radioactive rays.

7. A process according to claim 1, wherein the coating agent comprises at least one member selected from the group consisting of natural rubber, silicone rubber, ethylene-propylene rubber, ethylene-propylene-diene rubber, acrylonitrile-butadiene rubber, chloroprene rubber, an acrylic rubber, and a fluorine-containing rubber.

8. A process according to claim 1, wherein the coating agent is made from a rubber inert to a fuel gas and an oxidizing agent and, the rubber layer is vulcanized or crosslinked by a peroxide or irradiation of radioactive rays.

9. A process according to claim 1, wherein the coating agent is made from a rubber which is, in addition to being inert to a fuel gas and an oxidizing agent, substantially free from a vulcanizing agent and a vulcanizing auxiliary, and the rubber layer is crosslinked by irradiation of radioactive rays.

10. A process according to claim 1, wherein the coating agent contains an organic peroxide.

11. A process according to claim 1, wherein the coating agent contains a photopolymerization initiator.

* * * * *